US009231428B2

(12) United States Patent
Yoon et al.

(10) Patent No.: US 9,231,428 B2
(45) Date of Patent: Jan. 5, 2016

(54) LOW-POWER WIRELESS CHARGING APPARATUS AND METHOD THEREOF

(75) Inventors: Young Seok Yoon, Cheonan-si (KR); Eung Ju Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 441 days.

(21) Appl. No.: 13/607,422

(22) Filed: Sep. 7, 2012

(65) Prior Publication Data

US 2013/0082647 A1     Apr. 4, 2013

(30) Foreign Application Priority Data

Sep. 30, 2011   (KR) .................. 10-2011-0100315

(51) Int. Cl.
*H02J 7/00*     (2006.01)
*H02J 7/02*     (2006.01)
*H02J 5/00*     (2006.01)

(52) U.S. Cl.
CPC ........ *H02J 7/025* (2013.01); *H02J 5/005* (2013.01)

(58) Field of Classification Search
CPC ....... H02J 7/007; H02J 7/0024; H02J 7/0054; H02J 7/0013; H02J 7/0021; H02J 7/0026; H02J 7/1423; Y02T 90/168; H01M 10/441; H01M 2010/4271; H01M 10/482; H01M 10/4207; B60L 11/1866; B60L 11/1861
USPC .......................................... 320/116–121, 124
See application file for complete search history.

(56) References Cited

U.S. PATENT DOCUMENTS

2009/0302803 A1*  12/2009  Oh et al. .................. 320/118
2013/0214739 A1*  8/2013   Lee et al. ................. 320/118
2013/0285603 A1*  10/2013  Zeinstra et al. .......... 320/108

FOREIGN PATENT DOCUMENTS

JP    2010-220418       9/2010
KR    10-2008-0038683 A  5/2008

OTHER PUBLICATIONS

Office Action from counterpart Korean Patent Application No. 10-2011-0100315, mailed Dec. 20, 2012, 7 pages, English Summary included.

* cited by examiner

*Primary Examiner* — Nghia Doan
(74) *Attorney, Agent, or Firm* — NSIP Law

(57) ABSTRACT

Disclosed herein is a low-power wireless charging apparatus including: a plurality of primary coils corresponding to a plurality of receivers, respectively; a plurality of drivers periodically and sequentially transmitting receiver detect signals; a sensing unit detecting a current and a voltage according to a magnetic field changed by one or more of the plurality of primary coils; a comparator comparing the detected current and voltage with pre-set values; a low-power auxiliary control unit generating a wake-up signal when one or more receivers are present; and a main control unit turned on upon receiving the wake-up signal, and controlled to generate a wireless power signal for charging a corresponding receiver and transmit, whereby unnecessary power consumption can be prevented and the burden of the main control unit can be lessened, thus increasing efficiency.

11 Claims, 4 Drawing Sheets

LOW-POWER WIRELESS CHARGING APPARATUS AND METHOD THEREOF

CROSS REFERENCE TO RELATED APPLICATION

This application claims the benefit of Korean Patent Application No. 10-2011-0100315, filed on Sep. 30, 2011, entitled "Low-power Wireless Charging Apparatus and Method Thereof", which is hereby incorporated by reference in its entirety into this application.

BACKGROUND OF THE INVENTION

1. Technical Field

The present invention relates to a low-power wireless charging apparatus and a method thereof.

2. Description of the Related Art

In general, the majority of wireless communication devices require charging; however, the recently launched mobile devices have different types of wired connectors.

In order to overcome user inconvenience of charging mobile devices in a wired manner, a wireless charging technique has quickly progressed.

The wireless charging technique is performed using a magnetic resonance scheme and a magnetic induction scheme.

In particular, the magnetic resonance scheme allows for configuration of a system that can be charged at a distance, but since it is transferrable to a human body or a different device, harmfulness thereof remains to be solved in the future.

Meanwhile, the magnetic induction scheme is a power transmission scheme using electromotive force induced from a magnetic field. Since the magnetic induction scheme can transmit power only within a short distance of a few millimeters or a few centimeters, it is considered not to be harmful to the human body in comparison to the power transmission scheme using magnetic resonance.

For this reason, development of the wireless charging technique employing the magnetic induction scheme and propagation of corresponding products have been quickly promoted.

In a related art wireless charging apparatus and method using the magnetic induction scheme, it is determined whether or not there is a receiver desired to be wirelessly charged and, when a receiver to be wirelessly charged is detected, the receiver is authenticated whether or not it is a predefined one, and then, a wireless power signal is generated and transmitted to the receiver so that the receiver can be charged with power as much as required.

Namely, in the related art wireless charging apparatus and method, wireless power is charged in the receiver in order of detecting the receiver, authenticating the receiver, generating wireless power, and transmitting the wireless power to the receiver, and all of these processes are performed by a single control unit (e.g., a main control unit).

In particular, in order to detect the receiver, the controller must periodically and continuously transmit a receiver detection signal at certain time intervals, and when the wireless charging apparatus can simultaneously charge a plurality of receivers, the wireless charging apparatus commonly uses a method of continuously transmitting a detection signal at certain time intervals in order to detect receivers and detecting an impedance variation reflected from a resonator (or coil) by a voltage or a current sensor.

Thus, the related art wireless charging apparatus and method consume much power in detecting receiver(s).

SUMMARY OF THE INVENTION

The present invention has been made in an effort to provide a low-power wireless charging apparatus and method capable of determining the presence or absence of a receiver by using a low-priced auxiliary control unit and waking up and operating a main control unit only when there is a receiver.

According to a first preferred embodiment of the present invention, there is provided a low-power wireless charging apparatus including: a plurality of primary coils; a plurality of drivers periodically and sequentially transmitting receiver detect signals for detecting receivers connected to the plurality of primary coils, respectively; a sensing unit detecting a current and a voltage according to a magnetic field changed by one or more of the plurality of primary coils by the receiver detect signals transmitted through the plurality of drivers; a comparator comparing the current and voltage detected by the sensing unit with pre-set values; a low-power auxiliary control unit generating a wake-up signal when one or more receivers are present; and a main control unit turned on upon receiving a wake-up signal generated by the low-power auxiliary control unit, and controlled to generate a wireless power signal for charging a corresponding receiver and transmit the generated wireless power signal.

The low-power auxiliary control unit may include: an auxiliary control signal generator generating respective receiver detect signals to be transmitted through the plurality of drivers, respectively; and a low-power controller controlling the auxiliary control signal generator and the plurality of drivers to periodically and sequentially transmit the respective receiver detect signals generated by the auxiliary control signal generator through the plurality of drivers, controlling the sensing unit to detect a current and a voltage according to a magnetic field changed by one or more of the plurality of primary coils according to the respective receiver detect signals, and controlling the comparator to compare the detected current and voltage with pre-set values, and generate a wake-up signal including driver information and primary coil information corresponding to the detected current and voltage and transmit the generated wake-up signal to the main control unit when the detected current and voltage are greater than the pre-set values.

The main control unit may include: a main control signal generator generating a wireless power signal to be transmitted through a corresponding driver according to the driver information and the primary coil information included in the wake-up signal received from the low-power auxiliary control unit; and a main controller controlling the main control signal generator and the corresponding driver to transmit the wireless power signal generated by the main control signal generator through the corresponding driver, and controlled to transmit the wireless power signal to a corresponding receiver through a primary coil connected with the corresponding driver.

The main controller may transmit an authentication signal for authenticating the corresponding receiver through the corresponding driver and the primary coil and then determine whether or not a response signal transmitted from the corresponding receiver is received, and when the response signal is received, the main controller may be controlled to transmit the wireless power signal.

The plurality of drivers may include: a first driver transmitting the wireless power signal generated under the control of the main control unit through a corresponding primary coil among the plurality of primary coils; and a second driver periodically and sequentially transmitting the respective receiver detect signals generated under the control of the low-power auxiliary control unit through the plurality of primary coils.

The low-power wireless charging apparatus may further include: a switching unit installed between the plurality of drivers and the plurality of primary coils to perform switching to connect the plurality of drivers and the plurality of primary coils under the control of the main control unit and the low-power auxiliary control unit.

The switching unit may include: a first switch switched to connect the first driver and the plurality of primary coils; and a second switch switched to connect the second driver and the plurality of primary coils.

According to a second preferred embodiment of the present invention, there is provided a low-power wireless charging method including: (A) generating, by a low-power auxiliary control unit, receiver detect signals corresponding to a plurality of primary coils, respectively, to determine whether or not a receiver is present, and generating a wake-up signal when one or more receivers are present; and (B) turning on a main control unit by receiving the generated wake-up signal to generate a wireless power signal for charging a corresponding receiver and transmit the generated wireless power signal.

The low-power wireless charging method may further include: (C) transmitting the wireless power signal to charge the corresponding receiver, and changing the main control unit into a sleep mode when the charging of the corresponding receiver is completed.

Step (A) may include: (A-1) generating, by the low-power auxiliary control unit, respective receiver detect signals for detecting respective receivers corresponding to the plurality of primary coils; (A-2) transmitting the generated respective receiver detect signals through a plurality of drivers connected to the plurality of primary coils, respectively; (A-3) detecting a current and a voltage according to a magnetic field changed by one or more of the plurality of primary coils according to the respective receiver detect signals transmitted through the plurality of drivers; (A-4) comparing the detected current and voltage with pre-set values to determine whether or not the detected current and voltage are greater than the pre-set values; and (A-5) generating a wake-up signal when the detected current and voltage are greater than the pre-set values.

Step (B) may include: (B-1) turning on the main control unit by receiving the wake-up signal; (B-2) generating a wireless power signal for charging the corresponding receiver; and (B-3) transmitting the generated wireless power signal to a driver corresponding to the corresponding receiver to transmit the wireless power signal to the corresponding receiver through a primary coil connected to the driver.

DESCRIPTION OF THE PREFERRED EMBODIMENTS

Figure 1:
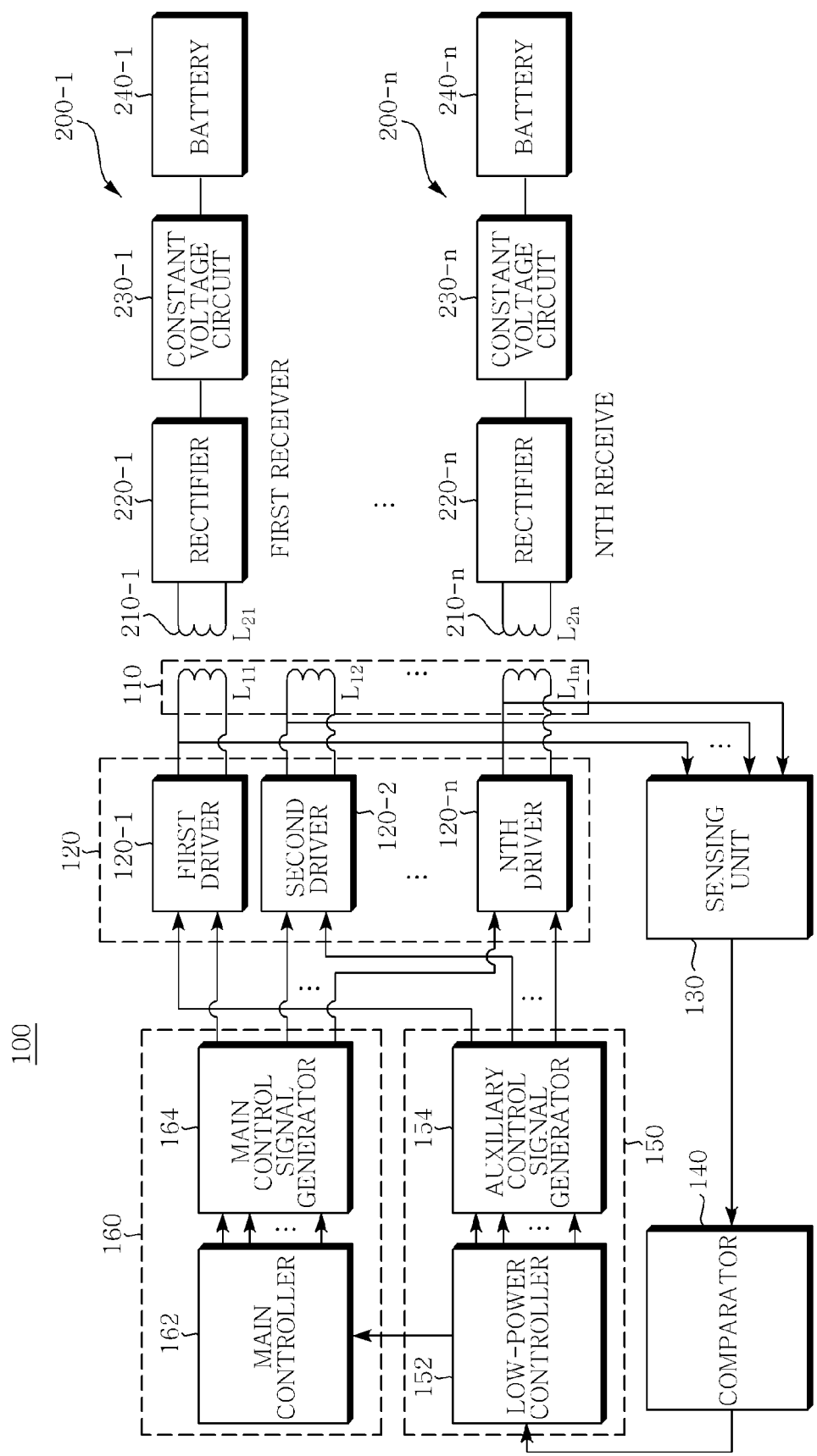
FIG. 1 a schematic block diagram of a low-power wireless charging apparatus according to a first embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

FIG. 1 a schematic block diagram of a low-power wireless charging apparatus according to a first embodiment of the present invention.

With reference to FIG. 1, a wireless charging apparatus according to a first embodiment of the present invention includes a plurality of primary coils 110, a plurality of drivers 120, a sensing unit 130, a comparator 140, a low-power auxiliary control unit 150, and a main control unit 160.

The plurality of primary coils 10 correspond to a plurality of receivers 200-1 to 200-n, respectively. In detail, the plurality of primary coils 110 may correspond to secondary coils 210-1 to 210-n of the plurality of receivers 200-1 to 200-n in a one-to-one manner to simultaneously charge the plurality of receivers 200-1 to 200-n wirelessly.

The plurality of drivers 120 are connected to the plurality of primary coils 110, respectively, and transmit respective receiver detect signals generated by a low-power auxiliary control unit 150 (to be described).

The receiver detect signals transmitted through the plurality of drivers 120, respectively, are transferred to the primary coils connected to the respective drivers 120 to detect the presence or absence of receivers corresponding to the primary coils $L_{11}$ to $L_{1n}$.

For example, when there is a receiver corresponding to any one of the plurality of primary coils 110, a magnetic field is changed by the corresponding primary coil (e.g., $L_{11}$) and a secondary coil $L_{21}$ of the corresponding receiver 200-1, so a current or a voltage according to the changed magnetic field are detected to thus detect the presence or absence of a receiver.

The sensing unit 130 detects a current and a voltage according to the magnetic field, which has been changed by one or more of the plurality of primary coils 110, by the respective receiver detect signals transmitted through the plurality of drivers 120 as described above.

The comparator 140 compares the current and the voltage detected by the sensing unit 130 with certain pre-set values.

For example, when the detected current and voltage are greater than the pre-set values, it may be determined that a receiver is present.

Conversely, when the detected current and voltage are smaller than the pre-set values, it may be determined that a receiver is not present.

Here, the pre-set values may be the minimum current and voltage values according to a minimum change in the magnetic field when a receiver previously agreed to be wirelessly charged is charged.

The low-power auxiliary control unit 150 may determine the presence or absence of a plurality of receivers corresponding to the plurality of primary coils 110, and when one or more receivers are present, the low-power auxiliary control unit 150 generates a wake-up signal and provides the generated wake-up signal to the main control unit 160.

The low-power auxiliary control unit 150 may include an auxiliary control signal generator 154 and a low-power controller 152.

The auxiliary control signal generator 154 generates respective receiver detect signals to be transmitted through the plurality of drivers 120 under the control of the low-power controller 152.

The low-power controller 152 may control the auxiliary controls signal generator 154 and the plurality of drivers 120 to periodically and sequentially transmit the respective receiver detect signals generated by the auxiliary control signal generator 154 through the plurality of drivers 120.

And then, the low-power controller 152 controls the sensing unit 130 to detect a current and a voltage according to a magnetic field which has been changed by one or more of the plurality of primary coils 110 according to respective receiver detect signals periodically and sequentially transmitted through the plurality of drivers 120.

Also, the low-power controller 152 may control the comparator 140 to compare the current and voltages detected by the sensing unit 130 with pre-set values to determine whether or not the detected current and voltage are greater than the pre-set values.

When the detected current and voltage are greater than the pre-set values, the low-power controller 152 generates a wake-up signal including driver information and primary coil information corresponding to the detected current and voltage and transmits the generated wake-up signal to the main control unit 160.

The main control unit 160 is turned on upon receiving the wake-up signal under the control of the main controller 162 (to be described), generates a wireless power signal for charging the corresponding receiver, and transmits the generated wireless power signal to the corresponding receiver.

The main control unit 160 may include a main control signal generator 164 and the main controller 162.

The main control signal generator 164 generates a wireless power signal to be transmitted through a corresponding driver according to the driver information and the primary coil information included in the wake-up signal under the control of the main controller 162 (to be described).

The main controller 162 controls the main control signal generator 164 and the corresponding driver to transmit the wireless power signal generated by the main control signal generator 164 through the corresponding driver.

And then, the main controller 162 transmits the wireless power signal transmitted through the corresponding driver to a corresponding receiver through the primary coil connected to the corresponding driver.

Also, the main controller 162 may transmit a certain authentication signal for authenticating the corresponding receiver through the primary coil and the driver corresponding to the detected current and voltage, and then, perform an authentication procedure for authenticating whether or not the corresponding receiver is a previously agreed one according to whether or not a response signal with respect to the transmitted authentication signal is received.

For example, when a previously agreed response signal is received from the corresponding receiver, the main controller 162 may generate a wireless power signal having a size required by the corresponding receiver and transmit the generated wireless power signal through the corresponding driver and the primary coil in the foregoing manner.

The wireless power signal transmitted through the main controller 162 may be charged in a battery through a certain process through a secondary coil of the corresponding receiver.

In detail, the receivers 200-1 to 200-$n$ include secondary coils 210-1 to 210-$n$, rectifiers 220-1 to 220-$n$, constant voltage circuits 230-1 to 230-$n$, and batteries 240-1 to 240-$n$, respectively.

As mentioned above, the secondary coils 210-1 to 210-$n$ corresponds to any one of the plurality of primary coils 110 of the low-power wireless charging apparatus according to an embodiment of the present invention to receive the wireless power signal transmitted through the corresponding primary coil.

The rectifiers 220-1 to 220-$n$ rectify the wireless power signal received through the secondary coils 210-1 to 210-$n$, and the constant voltage circuits 230-1 to 230-$n$ converts the rectified wireless power signal into a constant voltage and charges it in the batteries 240-1 to 240-$n$.

The low-power wireless charging apparatus according to an embodiment of the present invention is able to simultaneously charge the receivers 200-1 to 200-$n$ with a minimum of one to a maximum number (e.g., n number) of the plurality of primary coils 110.

Figure 2:
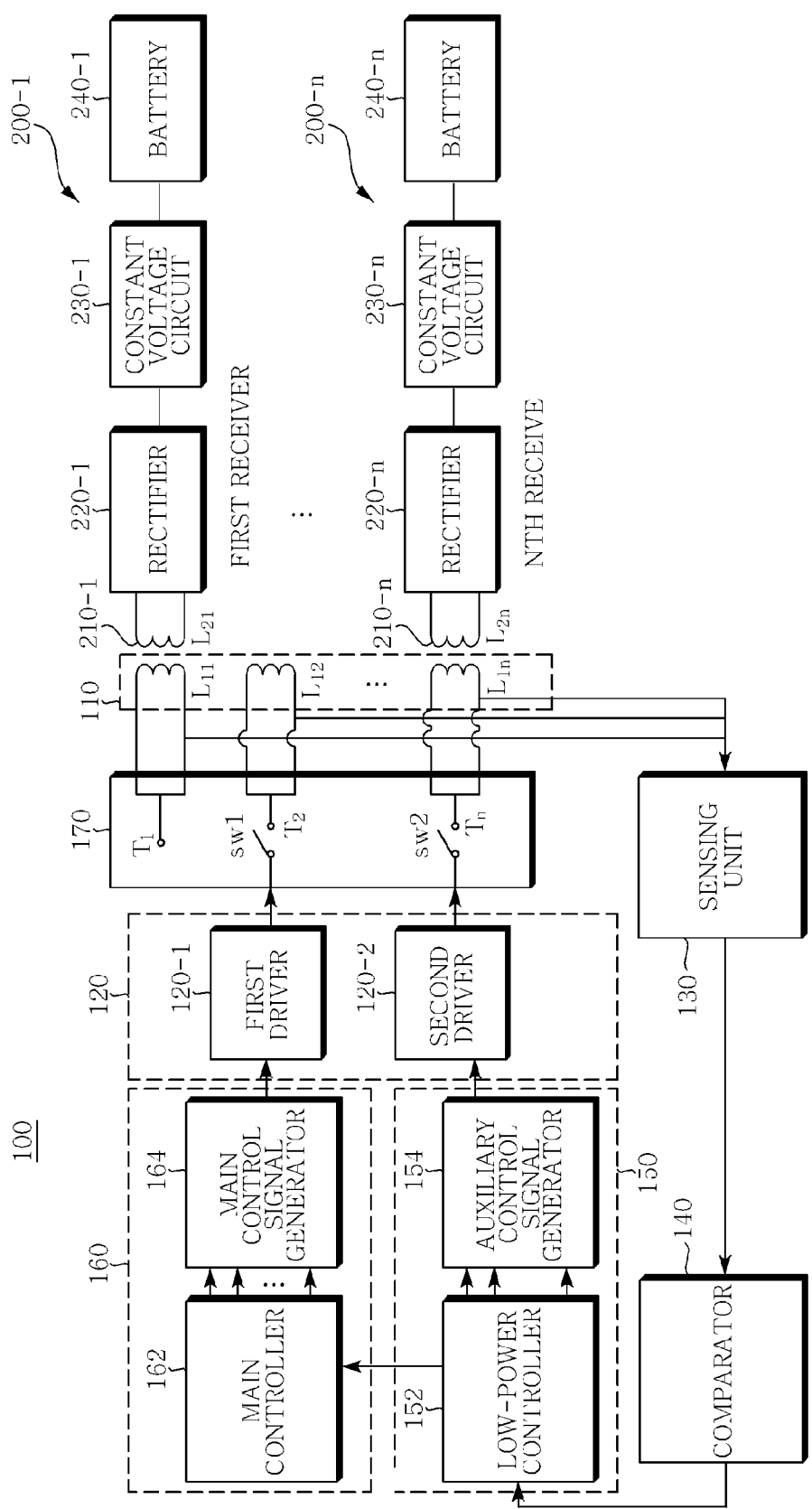
FIG. 2 is a schematic block diagram of a low-power wireless charging apparatus according to a second embodiment of the present invention.

FIG. 2 is a schematic block diagram of a low-power wireless charging apparatus according to a second embodiment of the present invention.

With reference to FIG. 2, the low-power wireless charging apparatus according to a second embodiment of the present invention includes a plurality of primary coils 110, a plurality of drivers 120, a switching unit 170, the sensing unit 130, the comparator 140, the low-power auxiliary control unit 150, and the main control unit 160.

Here, the low-power wireless charging apparatus according to the second embodiment of the present invention is the same as the low-power wireless charging apparatus according to the first embodiment of the present invention, except for the configuration of the switching unit 170 and the plurality of drivers 120, so a detailed description of the same elements will be replaced by the foregoing description.

Unlike the plurality of drivers 120 which correspond to the plurality of primary coils 110, respectively, in the low-power wireless charging apparatus according to the first embodiment of the present invention, the plurality of drivers 120 of the low-power wireless charging apparatus according to the second embodiment of the present invention include a first driver 120-1 connected with the main control unit 160 and a second driver 120-2 connected with the low-power auxiliary control unit 150.

The first driver 120-1 transmits a wireless power signal generated under the control of the main control unit 160 through a corresponding primary coil among the plurality of primary coils 110.

The second driver 120-2 periodically and sequentially transmits respective receiver detect signals generated under the control of the low-power auxiliary control unit 150 through the plurality of primary coils 110.

The switching unit 170 is installed between the plurality of drivers and the plurality of primary coils and performs switching to connect the plurality of drivers 120 and the plurality of primary coils 110 under the control of the lower power auxiliary control unit 150 and the main control unit 160.

The switching unit 170 includes a first switch sw1 switched to connect the first driver 120-2 and the plurality of primary coils 110 and a second switch sw2 switched to connect the second driver 120-1 and the plurality of primary coils 110.

Figure 3:
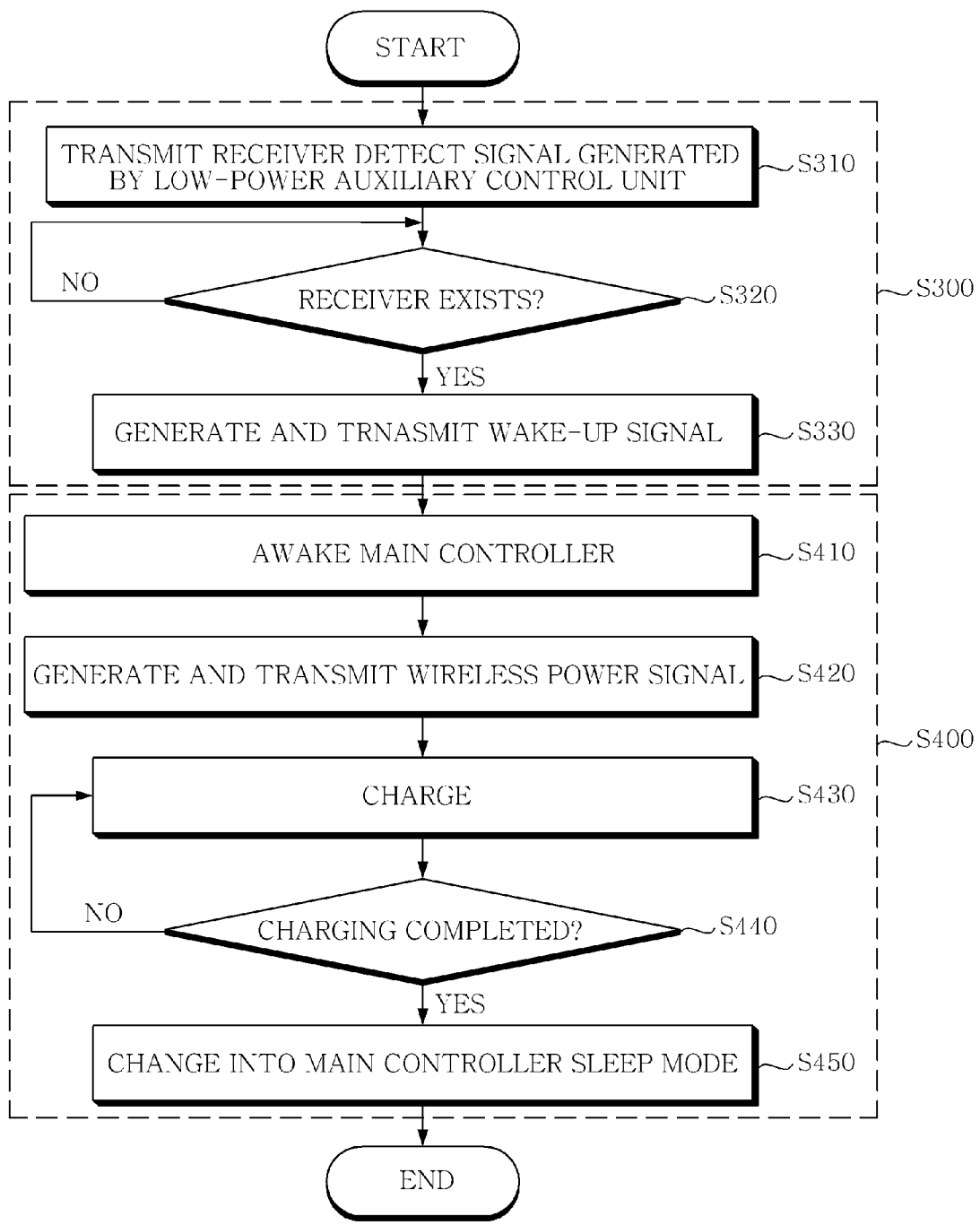
FIG. 3 is a flow chart illustrating the process of a low-power wireless charging method according to an embodiment of the present invention.
Figure 4:
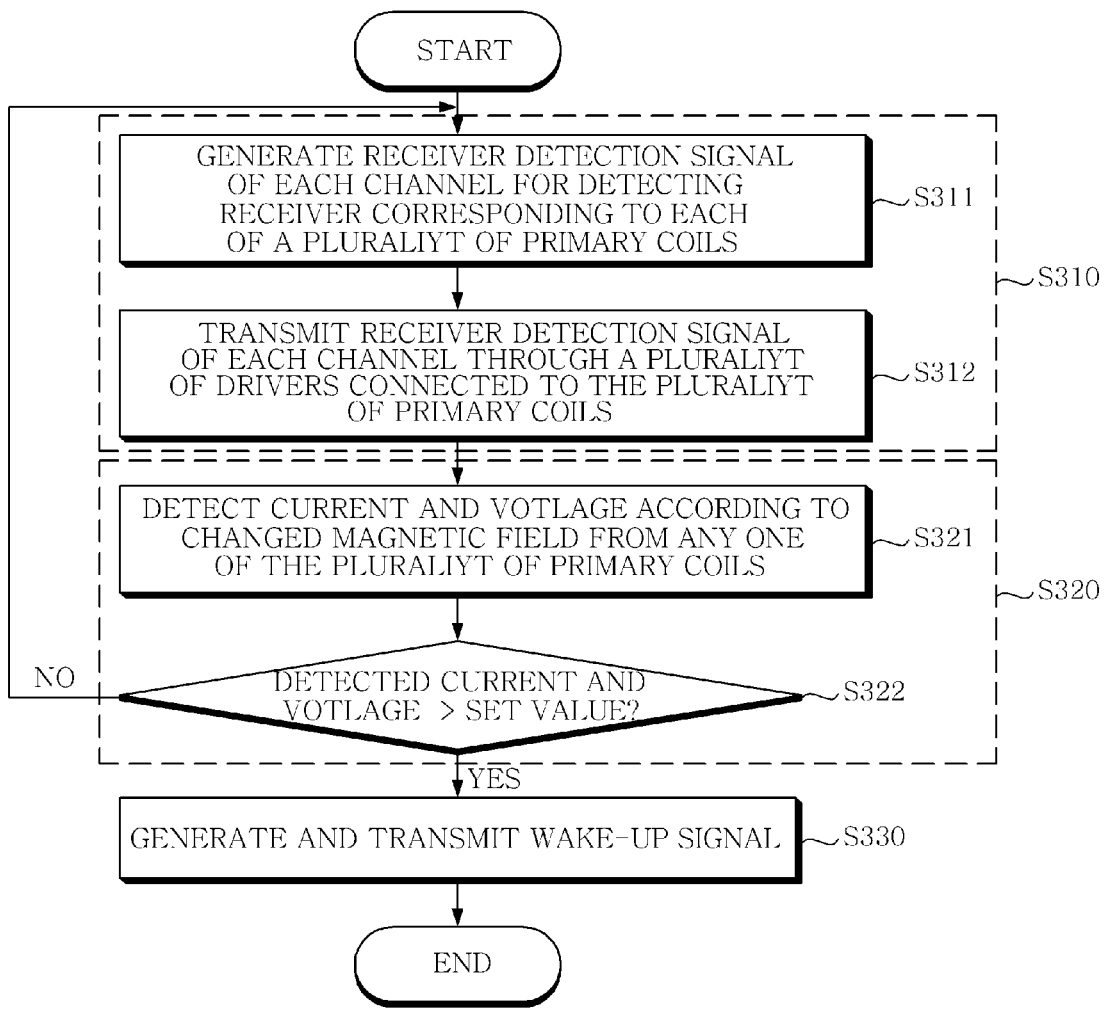
FIG. 4 is a detailed flow chart illustrating a process of determining the presence or absence of a receiver in the low-power wireless charging method illustrated in FIG. 3.

FIG. 3 is a flow chart illustrating the process of a low-power wireless charging method according to an embodiment of the present invention. FIG. 4 is a detailed flow chart illustrating a process of determining the presence or absence of a receiver in the low-power wireless charging method illustrated in FIG. 3.

With reference to FIGS. 3 and 4, a low-power wireless charging method according to an embodiment of the present invention may include a receiver presence and absence determining step S300 performed by the low-power auxiliary control unit 150 and a wireless power charging step S400 performed by the main control unit 160.

First, in the receiver presence and absence determining step S300, receiver detect signals of respective channels generated in the low-power auxiliary control unit 150 are periodically transmitted at certain time intervals (S310) to determine whether or not receivers 200-1 to 200-$n$ are present (S320).

In step S320, when the receivers 200-1 to 200-$n$ are present, the low-power auxiliary control unit 150 generates a wake-up signal and transmits the same to the main control unit 160, and when the receivers 200-1 to 200-$n$ are not present, the low-power auxiliary control unit 150 repeatedly perform step S320 in order to continuously monitor whether or not the receivers 200-1 to 200-$n$ are present.

In detail, in step S310, the low-power controller 152 of the low-power auxiliary control unit 150 generates the receiver detect signals of the respective channels in order to detect receivers corresponding to the plurality of primary coils 110, respectively (S311).

The thusly generated receiver detect signals of the respective channels are sequentially transmitted at certain time intervals through the plurality of drivers 120 connected to the plurality of primary coils, respectively (S312).

Then, the low-power auxiliary control unit 150 controls the sensing unit 130 to detect a current and a voltage according to a magnetic field changed by any one of the plurality of primary coils 110 according to transmitted receiver detect signals of the respective channels (S321).

Thereafter, the low-power auxiliary control unit 150 compares the current and the voltage detected in step S321 with pre-set values. When the detected current and voltage are greater than the pre-set values, the low-power auxiliary control unit 150 determines that the receivers 200-1 to 200-$n$ are present (S322). Here, the receivers 200-1 to 200-$n$ may be one or more receivers.

When the detected current and voltage are not greater than the pre-set values in step S322, the low-power auxiliary control unit 150 returns to step S311 and repeatedly perform the follow-up process.

When the low-power auxiliary control unit 150 determines that one or more receivers 200-1 to 200-$n$ are present in step S322, as described above, the low-power auxiliary control unit 150 generates a wake-up signal and transmits the same to the main control unit 160 (S330).

Meanwhile, when the wake-up signal generated in the receiver presence and absence determining step S300 is transmitted to the main control unit 160, the wireless power charging step S400 is performed as follows.

In the wireless power charging step S400, the wake-up signal transmitted from the low-power auxiliary control unit 150 is received and the main control unit 160 wakes up (S410).

The awaken main control unit 160 generates a wireless power signal corresponding to the receiver detected in step S300 and transmits the same to the corresponding receiver (S420). Then, the corresponding receiver receives the wireless power signal so as to be charged (S430).

Thereafter, the main control unit 160 determines whether or not the charging of the receiver has been completed (S440). When the charging has been completed, the main control unit 160 is changed into a sleep mode (S450), and when the charging has not been completed, the process is returned to step S430 and the follow-up process is repeatedly performed.

According to the low-power wireless charging apparatus and method as described above, the low-power auxiliary control unit 150 periodically determines whether or not a receiver is present, and the main control unit 160 is operated only when a receiver is present, whereby unnecessary power consumption can be prevented and the burden of the main control unit 160 can be lessened, thus increasing efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A low-power wireless charging apparatus comprising:
    a plurality of primary coils;
    a plurality of drivers configured to periodically and sequentially transmit receiver detect signals for detecting receivers connected to the plurality of primary coils, respectively;
    a sensor configured to detect a current and a voltage according to a magnetic field changed by one or more of the plurality of primary coils by the receiver detect signals transmitted through the plurality of drivers;
    a comparator configured to compare the current and voltage detected by the sensor with pre-set values;
    a low-power auxiliary control device configured to generate a wake-up signal when one or more receivers are present; and
    a main control device configured to turn on upon receiving the wake-up signal generated by the low-power auxiliary control unit, and controllable to generate a wireless power signal for charging a corresponding receiver and transmit the generated wireless power signal.

2. The apparatus as set forth in claim 1, wherein the low-power auxiliary control device includes:
    an auxiliary control signal generator configured to generate respective receiver detect signals to be transmitted through the plurality of drivers, respectively; and
    a low-power controller configured to control the auxiliary control signal generator and the plurality of drivers to periodically and sequentially transmit the respective receiver detect signals generated by the auxiliary control signal generator through the plurality of drivers, control the sensor to detect the current and the voltage according to the magnetic field changed by one or more of the plurality of primary coils according to the respective receiver detect signals, and control the comparator to compare the detected current and voltage with pre-set values, and generate the wake-up signal including driver information and primary coil information corresponding to the detected current and voltage and transmit the generated wake-up signal to the main control unit when the detected current and voltage are greater than the pre-set values.

3. The apparatus as set forth in claim 1, wherein the main control unit includes:
a main control signal generator configured to generate a wireless power signal to be transmitted through a corresponding driver according to the driver information and the primary coil information included in the wake-up signal received from the low-power auxiliary control device; and
a main controller configured to control the main control signal generator and the corresponding driver to transmit the wireless power signal generated by the main control signal generator through the corresponding driver, and controllable to transmit the wireless power signal to a corresponding receiver through a primary coil connected with the corresponding driver.

4. The apparatus as set forth in claim 3, wherein the main controller is configured to transmit an authentication signal for authenticating the corresponding receiver through the corresponding driver and the primary coil and then determine whether or not a response signal transmitted from the corresponding receiver is received, and wherein the main controller is configured to transmit the wireless power signal upon receiving the response signal.

5. The apparatus as set forth in claim 1, wherein the plurality of drivers include:
a first driver configured to transmit the wireless power signal generated under the control of the main control device through a corresponding primary coil among the plurality of primary coils; and
a second driver configured to periodically and sequentially transmit the respective receiver detect signals generated under the control of the low-power auxiliary control device through the plurality of primary coils.

6. The apparatus as set forth in claim 5, further comprising:
a switching unit installed between the plurality of drivers and the plurality of primary coils, the switching unit being configured to perform switching to connect the plurality of drivers and the plurality of primary coils under the control of the main control device and the low-power auxiliary control device.

7. The apparatus as set forth in claim 6, wherein the switching unit includes:
a first switch configured to be switched to connect the first driver and the plurality of primary coils; and
a second switch configured to be switched to connect the second driver and the plurality of primary coils.

8. A low-power wireless charging method comprising:
(A) generating, by a low-power auxiliary control device, receiver detect signals corresponding to a plurality of primary coils to determine whether or not a receiver is present, and generating a wake-up signal when one or more receivers are present; and
(B) turning on a main control device by receiving the generated wake-up signal to generate a wireless power signal for charging a corresponding receiver and transmit the generated wireless power signal.

9. The method as set forth in claim 8, further comprising:
(C) transmitting the wireless power signal to charge the corresponding receiver, and changing the main control device into a sleep mode when the charging of the corresponding receiver is completed.

10. The method as set forth in claim 8, wherein the operation (A) includes:
(A-1) generating, by the low-power auxiliary control device, respective receiver detect signals for detecting respective receivers corresponding to the plurality of primary coils;
(A-2) transmitting the generated respective receiver detect signals through a plurality of drivers connected to the plurality of primary coils, respectively;
(A-3) detecting a current and a voltage according to a magnetic field changed by one or more of the plurality of primary coils according to the respective receiver detect signals transmitted through the plurality of drivers;
(A-4) comparing the detected current and voltage with pre-set values to determine whether or not the detected current and voltage are greater than the pre-set values; and
(A-5) generating a wake-up signal when the detected current and voltage are greater than the pre-set values.

11. The method as set forth in claim 8, wherein the operation (B) includes:
(B-1) turning on the main controller by receiving the wake-up signal;
(B-2) generating a wireless power signal for charging the corresponding receiver; and
(B-3) transmitting the generated wireless power signal to a driver corresponding to the corresponding receiver to transmit the wireless power signal to the corresponding receiver through a primary coil connected to the driver.

* * * * *